United States Patent Office 2,706,720
Patented Apr. 19, 1955

2,706,720

INTERPOLYMERS OF ACRYLONITRILE WITH AMIDES AND IMIDES OF BICYCLO-(2,2,1)-5-HEPTENE CARBOXYLIC ACIDS

John R. Caldwell, Kingsport, Tenn., assignor to Eastman Kodak Company, Rochester, N. Y., a corporation of New Jersey No Drawing. Application August 19, 1953,
Serial No. 375,284

13 Claims. (Cl. 260—32.6)

This invention relates to interpolymers of acrylonitrile and amides and imides of bicyclo-[2,2,1]-5-heptene carboxylic acids, and to articles obtained therefrom.

It is known that bicyclo-[2,2,1]-5-heptene carboxylic acid (3,6-endomethylene 1,2,3,6-tetrahydrophthalic acid) and certain derivatives thereof can be copolymerized with certain other unsaturated, polymerizable compounds to give resinous products. These previously known products have not, however, been found suitable for preparing high quality synthetic fibers for one reason or another, but principally because such polymers have generally had too low softening points, poor elasticity and were not readily dyeable by commercially available dyes.

I have now found that high quality fibers can be made from resinous polymers prepared by interpolymerizing certain proportions of acrylonitrile with certain amides and imides of bicyclo-[2,2,1]-5-heptene carboxylic acids. The fibers produced from my new polymers show excellent tenacity, elongation and elastic recovery, as well as good affinity for commercial dyes such as cellulose acetate dyes and have unusually high melting or softening points. Whereas interpolymers of acrylonitrile containing more than about 12 to 15 per cent of another monomer generally soften below 200° C., thereby severely limiting their use in synthetic fibers, I have found that as much as 15 to 20% of the bicycloheptene derivatives of my invention can be present in an interpolymer with acrylonitrile and the product softens only at the much higher temperatures of from about 215° to 230° C. These properties together with improved solubility over a wider range of solvents, as compared with polyacrylonitrile, make my new resinous polymers outstanding, especially for fiber-forming purposes.

It is, accordingly, an object of my invention to provide a new class of acrylonitrile polymers. A further object is to provide methods for preparing such polymers. Still another object is to provide homogeneous solutions comprising these polymers. Another object is to provide synthetic fibers from these polymers and their solutions. Other objects will become apparent from a consideration of the following description and examples.

In accordance with my invention, I provide resinous interpolymers comprising from 65 to 95% by weight of acrylonitrile and from 35 to 5% by weight of a bicycloheptene derivative selected from those represented by the following general formulas:

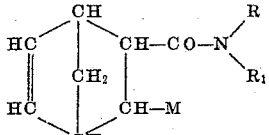

and

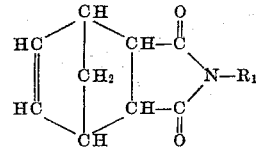

wherein R represents a hydrogen atom or a methyl, ethyl or β-hydroxyethyl group, R₁ represents a hydrogen atom, or a methyl, ethyl, β-hydroxyethyl or phenyl group and M represents a hydrogen atom or the group —CONRR₁ by heating in the presence of a polymerization catalyst a mixture comprising acrylonitrile and the bicycloheptene derivative, in proportions about the same as set forth above. Preferably my new polymers contain from 75 to 90% by weight of acrylonitrile and from 25 to 10% by weight of the bicycloheptene derivative. If desired, a minor portion of another monomer, from about 1% up to about 8% based on the total weight of the monomers, such as acrylamide, methacrylamide and their N-methyl, N-ethyl, N-propyl and N-butyl derivatives, can be added to the polymerization mixtures to obtain the corresponding terpolymers. In this case, the acrylonitrile always comprises from 75 to 90% of the total weight of the interpolymer, while the bicycloheptene derivatives comprises from 24 to 10% of the total weight of the interpolymer. However, the preferred polymers of my invention are the copolymers. In general, those of my polymers containing up to 20% by weight of the bicycloheptene derivative give fibers that stick to the hot bar at temperatures above 200° C. and usually in the range of 215° to 230° C. Polymers of my invention which contain more than 20% of the bicycloheptene derivative have somewhat lower sticking temperatures. Polymers containing less than 5% of the bicycloheptene derivative, the remainder being acrylonitrile, tend to be more brittle and less soluble, and are unsuitable for preparing the articles of my invention.

Typical bicycloheptene derivatives which may be used in practicing my invention include bicyclo-[2,2,1]-5-heptene - 2,3 - dicarboximide, bicyclo-[2,2,1]-2,3-dicarboxylic acid-N - methylimide, bicyclo-[2,2,1]-5-heptene-2,3-dicarboxylic acid-N-ethylimide, bicyclo-[2,2,1]-5-heptene-2,3-dicarboxylic acid-N-β-hydroxyethylimide, bicyclo-[2,2,1]-5-heptene-2,3 - dicarboxylic acid-N-phenylimide, bicyclo-[2,2,1]-5-heptene-2,3-dicarboxylic acid - di - N - methylamide, bicyclo-[2,2,1]-5-heptene-2,3-dicarboxylic acid-di-N - diethylamide, bicyclo-[2,2,1]-5-heptene-2,3-dicarboxylic acid-di-N - β - hydroxyethylamide, bicyclo-[2,2,1]-5-heptene-2,3-dicarboxylic acid - N - phenylamide, bicyclo-[2,2,1] - 5 - heptene - 2 - carboxylic acid amide, bicyclo-[2,2,1]-5-heptene-2,3-dicarboxylic acid diamide, bicyclo-[2,2,1]-5-heptene-2-carboxylic acid-di-N-methylamide, bicyclo-[2,2,1]-5 - heptene - 2 - carboxylic acid-di-N-ethylamide, and the like. The bicycloheptene derivatives are conveniently made by Diels-Alder reactions with cyclopentadiene and α,β-unsaturated acid derivatives. When acrylic acid derivatives are employed, the monocarboxylic derivative is obtained. When maleic or fumaric acid derivatives are used, the dicarboxylic derivatives are obtained. The imides are conveniently made by adding cyclopentadiene to maleic anhydride, then treating the product with an amine or ammonia.

The polymerizations for preparing the new resinous polymers of the invention can be carried out in mass, in solution in an organic solvent such as acetone, acetonitrile, ethyl alcohol, tertiary butyl alcohol etc., or in aqueous dispersion, in the presence of a polymerization catalyst. Heat and actinic light also accelerate the polymerizations. Peroxide catalysts which are soluble in the monomers or in the solvent mediums for the polymerization can be used, e. g. organic and inorganic peroxides such as benzoyl peroxide, acetyl peroxide, lauroyl peroxide, hydrogen peroxide, persulfates e. g. alkali metal persulfates such as sodium and potassium persulfates, ammonium persulfate, etc., perborates e. g. alkali metal perborates such as sodium and potassium perborates, ammonium perborate, etc. Azo-bis-nitriles are also effective polymerization catalysts. Mixtures of catalysts can be employed. The amount employed of such catalyst can be varied over a wide range, but advantageously from about 0.01 to 2.0 per cent or even more, based on the total weight of monomer to be polymerized. Normal pressures are generally employed; however, good results are also obtainable at pressures below and above normal atmospheric pressures. The temperature at which the polymerizations are carried out can vary from 30° to 100° C. and preferably from 50° to 70° C. Batch or continuous processes can be employed. Where a continuous process is desirable, the monomers and other substituents making up the reaction mixture can be added to the reaction system in continuous manner and the polymer withdrawn from the system as formed.

The preferred method is to polymerize the monomers in aqueous dispersion, in the presence of a surface active agent and a polymerization catalyst which is water-soluble such as sodium persulfate, potassium persulfate, sodium perborate, hydrogen peroxide, etc. In this case, reducing agents such as alkali metal sulfites and bisulfites, e. g. sodium, potassium, etc. sulfites and metabisulfites can be added to the polymerization reaction mixture in about the same amount as the polymerization catalyst to reduce the time required to effect polymerization. If desired, chain regulators can be employed such as hexyl, cetyl, dodecyl, myristyl, etc. mercaptanes. Suitable surface active agents include fatty acid soaps, fatty alcohol sulfates such as sodium lauryl sulfate, potassium lauryl sulfate, etc., alkali metal salts of aromatic sulfonic acids e. g. sodium isobutylnaphthalene sulfonate, sulfosuccinic esters, ethylene oxide condensation products, sulfonated fatty acid amides, alkali metal salts of alkane sulfonic acids, sulfonated ethers, and the like. Mixtures of these surface active agents can also be employed.

The following examples will serve further to illustrate the manner whereby I practice my invention.

Example 1

18 g. of acrylonitrile, 3 g. of bicyclo-[2,2,1]-5-heptene-2,3-dicarboximide and 0.2 g. of azo-bis-isobutyronitrile were dissolved in 20 cc. of ethyl acetate. The solution was allowed to stand at 50° C. for 48 hours. The polymer precipitated from solution as it formed and washed filtered, washed with acetone and dried. A yield of 16 g. of product was obtained. Analysis of the product gave 24.4% by weight of nitrogen corresponding to copolymer of approximately 87.8% by weight of acrylonitrile and 12.2% by weight of bicyclo-[2,2,1]-5-heptene-2,3-dicarboximide. The polymer was soluble in dimethylformamide, dimethylacetamide, gamma-butyrolacetone and ethylene carbonate.

A spinning solution was prepared by dissolving 8 g. of the above prepared polymer in 40 cc. of dimethylformamide. The solution was extruded through a multihole spinneret into a coagulating bath consisting of 75 parts by weight of water and 25 parts by weight of dimethylformamide. The fibers obtained were washed, dried and drafted at 160°–180° C. They had a strength of 2.5–5 grams per denier and elongation of 18–24%. They showed a sticking temperature to the hot bar of 215°–220° C. The fibers dyed well with cellulose dyes, vat dyes and acid wool dyes.

In place of the bicyclo-[2,2,1]-5-heptene-2,3-dicarboximide, there may be substituted in the above example a like amount of bicyclo-[2,2,1]-5-heptene-2,3-dicarboxylic acid-N-methylimide to give with acrylonitrile the corresponding resinous copolymer of generally similar properties.

Example 2

A mixture of 15 g. of acrylonitrile, 5 g. of bicyclo-[2,2,1] - 5 - heptene - 2,3-dicarboxylic acid-di-N-methylamide, 0.5 g. of sodium dodecyl sulfate, 0.2 g. of benzoyl peroxide, 0.2 g. of potassium persulfate and 90 cc. of water was in a bottle and tumbled at 50°–55° C. for 48 hours. The yield of polymer was 12–15 g. It analyzed 23.2% by weight of nitrogen which corresponds to a copolymer containing 75% by weight of acrylonitrile and 25% by weight of the bicyclo-[2,2,1]-5-heptene-2,3-dicarboxylic acid-di-N-methylamide. The polymer was soluble in dimethylacetamide, diethylformamide, γ-valerolactone, and a mixture of 2 parts by weight acetonitrile and 1 part by weight dimethylformamide, as well as in more active solvents such as dimethylformamide, dimethyl acetamide, etc. Fibers spun from the polymer had a sticking temperature of 210° C. This figure is relatively high for an interpolymer containing only 75% by weight of acrylonitrile. The fibers dyed well with cellulose acetate dyes and acid wool dyes.

In place of the bicyclo-[2,2,1]-5-heptene-2,3-dicarboxylic acid-di-N-methylamide, there may be substituted in the above example a like amount of bicyclo-[2,2,1]-5-heptene-2,3-dicarboxylic acid-di-N-ethylamide to give with acrylonitrile the corresponding resinous copolymer of generally similar properties.

Example 3

16 g. of acrylonitrile, 4 g. of bicyclo-[2,2,1]-5-heptene-2,3-dicarboxylic acid-N-hydroxyethylimide and 0.2 g. of azo-bis-isobutyronitrile were dissolved in 25 cc. of tertiary butyl alcohol. The solution was allowed to stand at 50°–55° C. for 48 hours. The product was a copolymer containing approximately 88% by weight of acrylonitril and 12% by weight of bicyclo-[2,2,1]-5-heptene-2,3 - dicarboxylic acid - N-β-hydroxyethylimide. Fibers were spun from the polymer by extruding a solution of the polymer in dimethylacetamide into a hot air cabinet. After drafting, the fibers showed a sticking temperature of 215°–220° C. as measured on the hot bar. They dyed well with cellulose acetate dyes and acid wool dyes.

Example 4

A mixture of 40 g. of acrylonitrile, 3 g. of N-methyl methacrylomide, 7 g. of bicyclo-[2,2,1]-5-heptene-2,3-dicarboxylic acid-N-β-hydroxyethylimide, 1 g. of sodium octadecyl sulfate, 0.6 g. of potassium persulfate and 400 cc. of water was placed in a bottle and tumbled at 50° C. for 24 hours. Then 0.2 g. more of potassium persulfate was added and the reaction continued at 50° C. for an additional 20 hours. The yield of polymer was 41–42 g. Analysis showed that a copolymer was obtained containing approximately the proportions of polymerizable components as were present in the starting polymerization mixture. The polymer was soluble in dimethylformamide, dimethylacetamide, etc. and gave fibers which showed a sticking temperature of 220°–225° C. The fibers dyed well with cellulose acetate dyes, acid wool dyes and vat dyes.

Example 5

16 g. of acrylonitrile and 4 g. of bicyclo-[2,2,1]-5-heptene-2,3-dicarboxylic acid-N-β-hydroxyethylimide were placed in a glass tube and 0.2 g. of azo-bis-isobutyronitrile added as catalyst. The mixture was allowed to stand at 50° C. for 48 hours. The product obtained was a copolymer containing approximately 80% by weight of acrylonitrile, the balance being the bicycloheptene compound. Fibers prepared from this polymer dyed well with cellulose acetate dyes and acid wool dyes.

By varying the proportions of polymerizable compounds in the above examples, other resinous polymers of my invention coming within the range of from 65 to 95% by weight of acrylonitrile and from 35 to 5% by weight of the mentioned bicycloheptene derivatives, with or without a minor portion of an unsaturated amide such as acrylamide, methacrylamide, etc., can be prepared. All of the polymeric products of my invention are soluble in one or more solvents commonly used for dissolving polyacrylonitrile such as dimethylformamide, dimethylacetamide, gamma-butyrolactone, ethylene carbonate, ethylene cyanohydrin and succinonitrile. Those of my new polymers containing more than about 16% by weight of the bicycloheptene derivative are, in addition, soluble in less active solvents and solvent mixtures such as diethylformamide, diethylacetamide, valerolactone, and a mixture of 2:1 of acetonitrile and dimethylformamide.

The solutions of the polymers in one or more of the above mentioned solvents can be readily spun to fibers by wet or dry spinning methods or cast onto smooth surfaces to give films, sheets, etc. which are useful as photographic film supports or bases. The polymers of the invention can also be molded by injection or compression methods into stable, shaped articles. Such solutions or compositions can, if desired, have incorporated therein suitable plasticizers, fillers, dyes, and the like.

What I claim is:

1. A polymer comprising from 65 to 95% by weight of acrylonitrile and from 35 to 5% by weight of a compound selected from the groups consisting of those represented by the following general formulae:

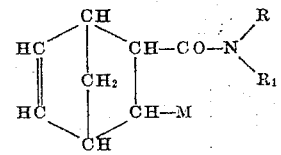

and

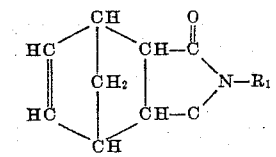

wherein R represents a member selected from the group consisting of a hydrogen atom, a methyl group, an ethyl group and a β-hydroxyethyl group, R₁ represents a member selected from the group consisting of a hydrogen atom, a methyl group, an ethyl group, a β-hydroxyethyl group and a phenyl group and M represents a member selected from the group consisting of a hydrogen atom and the group —CO—NRR₁.

2. A copolymer of from 75 to 90% by weight of acrylonitrile and from 25 to 10% by weight of bicyclo-[2,2,1]-5-heptene-2,3-dicarboximide.

3. A copolymer of from 75 to 90% by weight of acrylonitrile and from 25 to 10% by weight of bicyclo-[2,2,1]-5 - heptene - 2,3 - dicarboxylic acid-di-N-methylamide.

4. A copolymer of from 75 to 90% by weight of acrylonitrile and from 25 to 10% by weight of bicyclo-[2,2,1] - 5 - heptene - 2,3-dicarboxylic acid-N-β-hydroxyethylimide.

5. A copolymer of from 75 to 90% by weight of acrylonitrile and from 25 to 10% by weight of bicyclo-[2,2,1]-5-heptene-2,3-dicarboxylic acid-N-methylimide.

6. A polymer consisting of from 75 to 90% by weight of acrylonitrile, from 24 to 10% by weight of bicyclo-[2,2,1] - 5 - heptene - 2,3-dicarboxylic acid-N-β-hydroxyethylimide and from 1 to 8% by weight of N-methyl methacrylamide.

7. A solution of a polymer comprising from 65 to 95% by weight of a compound selected from the groups consisting of those represented by the following general formulae:

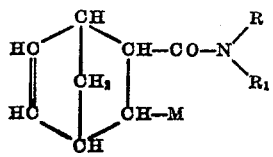

and

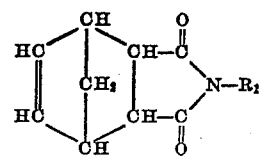

wherein R represents a member selected from the group consisting of a hydrogen atom, a methyl group, an ethyl group and a β-hydroxyethyl group, R₁ represents a member selected from the group consisting of a hydrogen atom, a methyl group, an ethyl group, a β-hydroxyethyl group and a phenyl group and M represents a member selected from the group consisting of a hydrogen atom and the group —CO—NRR₁, in a solvent selected from the group consisting of dimethylformamide, dimethylacetamide, gamma-butyrolactone, ethylene carbonate, ethylene cyanohydrin, succinonitrile, diethylformamide, diethylacetamide, valerolactone and a 2:1 mixture of acetonitrile and dimethylformamide.

8. A solution of a copolymer of from 75 to 90% by weight of acrylonitrile and from 25 to 10% by weight of bicyclo-[2,2,1]-5-heptene-2,3-dicarboximide, in dimethylformamide.

9. A solution of a copolymer of from 75 to 90% by weight of acrylonitrile and from 25 to 10% by weight of bicyclo - [2,2,1] - 5 - heptene-2,3-dicarboxylic acid-di-N-methylamide, in diethyl acetamide.

10. A solution of a copolymer of from 75 to 90% by weight of acrylonitrile and from 25 to 10% by weight of bicyclo - [2,2,1]-5-heptene-2,3-dicarboxylic acid-N-β-hydroxyethylimide, in dimethylacetamide.

11. A solution of a copolymer of from 75 to 90% by weight of acrylonitrile and from 25 to 10% by weight of bicyclo - [2,2,1]-5-heptene-2,3-dicarboxylic acid-N-methylimide, in dimethylformamide.

12. A solution of a polymer consisting of from 75 to 90% by weight of acrylonitrile, from 24 to 10% by weight of bicyclo-[2,2,1]-5-heptene-2,3-dicarboxylic acid-N-β-hydroxyethylimide and from 1 to 8% by weight of N-methyl methacrylamide, in dimethyl formamide.

13. A synthetic fiber of a polymer comprising from 65 to 95% by weight of acrylonitrile and from 35 to 5% by weight of a compound selected from the group consisting of those represented by the following general formulae:

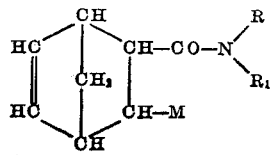

and

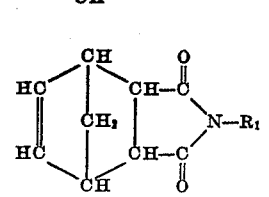

wherein R represents a member selected from the group consisting of a hydrogen atom, a methyl group, an ethyl group and a β-hydroxyethyl group, R₁ represents a member selected from the group consisting of a hydrogen atom, a methyl group, an ethyl group, a β-hydroxyethyl group and a phenyl group and M represents a member selected from the group consisting of a hydrogen atom and the group —CO—NRR₁.

No references cited.